United States Patent
Agahi et al.

(10) Patent No.: US 6,310,414 B1
(45) Date of Patent: *Oct. 30, 2001

(54) SHAFT BEARING SYSTEM

(75) Inventors: Reza R. Agahi, Granada Hills; Behrooz Ershaghi, Irvine, both of CA (US)

(73) Assignee: Rotoflow Corporation, Gardens, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/263,034

(22) Filed: Jun. 21, 1994

(51) Int. Cl.$^7$ ........................................ H02K 7/09
(52) U.S. Cl. ........................ 310/40.5; 415/34; 415/104; 415/105; 418/365
(58) Field of Search ..................... 310/90.5; 415/34, 415/279, 104–107; 417/365, 424.1

(56) References Cited

U.S. PATENT DOCUMENTS

| | | | |
|---|---|---|---|
| 3,895,689 | * | 7/1975 | Swearingen ..................... 415/104 X |
| 4,385,768 | * | 5/1983 | Swearingen ........................ 415/34 X |
| 4,763,032 | * | 8/1988 | Bramm et al. ...................... 310/90.5 |
| 5,104,284 | | 4/1992 | Hustak, Jr. et al. ................. 415/105 |
| 5,126,612 | * | 6/1992 | Girault ............................... 310/90.5 |
| 5,248,239 | | 9/1993 | Andrews .............................. 415/104 |
| 5,310,311 | * | 5/1994 | Andres et al. ...................... 415/229 |
| 5,312,226 | * | 5/1994 | Miura et al. .................... 310/90.5 X |
| 5,345,127 | * | 9/1994 | New .................................. 310/90.5 |
| 5,347,190 | * | 9/1994 | Lewis et al. ....................... 310/90.5 |

FOREIGN PATENT DOCUMENTS

| | | |
|---|---|---|
| 0550801 | 7/1993 | (EP) . |
| 1187395 | 10/1989 | (JP) . |

* cited by examiner

Primary Examiner—Mark O. Budd
(74) Attorney, Agent, or Firm—Lyon & Lyon LLP

(57) ABSTRACT

A turboexpander associated with a rotary compressor by means of a rotor shaft connecting the two. A bearing housing includes magnetic radial and thrust bearings which control the placement and dynamics of the shaft within the housing. A control passageway extends from the inlet of the compressor to the gas cavity behind the compressor rotor. This passage is controlled by a valve and in turn by the magnetic bearing controller to augment the operation of the active magnetic thrust bearings.

3 Claims, 2 Drawing Sheets

SHAFT BEARING SYSTEM

BACKGROUND OF THE INVENTION

The field of the present invention is bearing systems for turbo machinery.

Turboexpanders typically include a radial inflow turbine rotor mounted within a housing having a radial inlet and an axial outlet. The turbine rotor is rotatably mounted within bearings through a shaft fixed to the rotor. Such turboexpanders may be used with a wide variety of different gas streams for such things as air separation, natural gas processing and transmission, recovery of pressure letdown energy from an expansion process, or thermal energy recovery from the waste heat of associated processes.

For air separation applications, turboexpanders are designed to optimize the insulation of the cold sections of the expander to realize high efficiencies at design conditions. In high-pressure applications, these machines are capable of expansion beyond the critical point. In low-pressure and medium-pressure applications, energy from the turboexpander can be used as the final stage of the recycle compressor. Compressors can be associated with such turboexpanders as a means to derive work or simply dissipate energy from the turboexpander.

In turboexpanders and other such fluid processing turbo machinery, the differential pressure across the rotor of the device can lead to thrust loads on the associated shaft. Depending on the pressure gradient and the configuration of the rotor, an axial thrust load will develop that will vary depending on such things as differential pressure between input and output and rotor speed. Two mechanisms for adjusting or accommodating thrust loading are illustrated in U.S. Pat. No. 3,895,689, issued Jul. 22, 1975, for Thrust Bearing Lubricant Measurement And Balance, and U.S. Pat. No. 4,385,768, issued May 31, 1983, for Shaft Mounting Device And Method, the disclosures of which are incorporated herein by reference. In both devices, axial position of the shaft is sensed. A control passage extends from a low-pressure position on the device to a high-pressure position. The passage is controlled by a valve which is responsive to the shaft position as detected by the sensor. By selectively venting the high pressure on the back of the rotor, thrust loading resulting from the differential pressure across the rotor can be modified. In both examples, thrust bearings are employed in conjunction with the thrust control system. Conventional bearings are shown.

Two primary types of bearings that may be used to support the rotor shaft in turbo machinery are magnetic bearings and oil film bearings. Magnetic bearings provide superior performance over oil film bearings. Magnetic bearings have low drag losses, high stiffness and damping, and moderate load capacity. In addition, unlike oil film bearings, magnetic bearings do not require lubrication, thus eliminating oil, valves, pumps, filters, coolers and the like with the risk of process contamination.

There are two types of magnetic bearings, active and passive. Passive magnetic bearings inherently lack damping properties and, as such, are not suitable for application in dynamic industrial equipment such as compressors, turbines, pumps, motors, and other rotating equipment.

Active magnetic bearings are characterized by a ferromagnetic rotor shaft that is surrounded by electromagnetic coils and by position sensing and control electronics. The shaft assembly is supported by active magnetic radial bearings at appropriate positions on the rotor shaft. The magnetic radial bearings levitate the rotor shaft using a continuously-controlled magnetic field. Centralized active magnetic thrust bearings are typically used to control the axial position of the rotor shaft. An active magnetic thrust bearing system typically includes opposed electromagnetic coils fixed to a housing with thrust disks positioned on the rotor shaft. One bearing or the other may be activated by a controller to repulse a disk as a mechanism for axially recentering a shaft.

Antifriction bearings as well as seals may be installed at each end of the rotor shaft to support it when the magnetic bearings are not energized. This avoids any contact between the rotor shaft and the stator of the radial magnetic bearings. These auxiliary or "back-up" bearings are dry lubricated, and they remain unloaded during normal operation.

The conventional method of detecting the axial position of the rotor shaft in order to compensate for axial thrust variations employs noncontacting probes. Each probe produces an output voltage that is proportional to the detected size of the gap between the probe and a discontinuity on the shaft such as a collar. Using proprietary control loops, active magnetic bearings adjust thrust bearing magnetic fields in accordance with the probe output voltages to maintain a balanced axial position of the rotor shaft. When the axial position of the rotor shaft changes, the detected size of the air gap changes, and the probes, in response, alter their output voltages.

Electronic control systems for active magnetic bearings control the position of the rotor shaft by adjusting current to the electromagnets in response to signals from the shaft position sensors or probes. When the electronics energize the electromagnetic coils, attractive forces between the rotor shaft and the coils cause the rotor shaft to be suspended and axially positioned. Sensor readings are combined using control loops that are proprietary to the bearing manufacturers, enabling active magnetic bearings to adjust thrust bearing magnetic fields in accordance with the probe output voltages. This maintains a balanced axial position of the rotor shaft without regard for elliptical or triangular deformation of the rotor shaft surface. The sensor readings may thus be used to automatically cancel rotation signal harmonics.

The electronics may also be used to adjust the stiffness and damping of the active magnetic bearings for specific roto-dynamic applications. The electronic control provides more effective damping than is possible with mechanical arrangements. Electronic adaptation to stiffness in the control system allows the first bending critical speeds to be located safely out of the nominal operating range. A high damping factor can be established to allow the rotor shaft to safely pass across critical speeds.

During operation, high-speed turbo machinery is subject to process pressures and flow variations. Many of the maintenance problems experienced with turbo machinery originate in the thrust bearings. This is primarily the result of wide variations in thrust loading. Process-induced variations in axial thrust can cause thrust overloads in turboexpanders in general and in compressor-loaded turboexpanders in particular. Off-design operation and unforeseen transient process conditions can also trigger overloads. These overloads may damage internal parts of the turbomachinery and, in some instances, may cause major failure. Active magnetic bearings that comprise radial and double-acting thrust bearings monitor the axial position of the rotor shaft using position sensors or probes. If a thrust-force imbalance occurs, magnetic force acting on one of the two thrust bearings is adjusted to maintain the rotor shaft in its axially-balanced position. Such active magnetic thrust bearings, such as those manufactured by S2M (Societe de Mecanique Magnetique) of France, provide an advantageous alternative to conventional oil bearing systems for many turbo machinery applications.

A number of advantages are associated with magnetic bearings. By suspending the shaft in magnetic fields, there are virtually no friction surfaces to wear and require frequent attention. No lubrication is required with its inherent danger of process contamination and its required lubrication support equipment. Very high rotational speeds can also be achieved because of the elimination of friction surfaces. With minimal friction, energy losses are minimized. A wide variety of temperatures may also be used as the bearings do not employ lubricants affected by temperature. The available electronics for controlling such bearings make possible accurate control, minute system changes, adjustable stiffness and damping, and reliable control signals that may be employed for automatic shutdown. The inherent nature of such bearings also allows the shaft to rotate about an inertial axis rather than a geometric axis to substantially reduce imbalance and equipment vibration problems.

Despite the advantages of using active magnetic bearings in turbomachinery, damaging thrust overloads remain a possibility. For example, off-design operation or unforeseen transient process conditions can trigger overloads. Axial rotor shaft position control is typically not capable of compensating for, or reacting quickly enough to, excessive axial thrust variations. The thrust load capacity of the thrust bearings in such active magnetic bearings is understandably physically and mechanically limited. To protect turbo machinery from excessive thrust forces, these active magnetic bearings are equipped with an alarm to shut the equipment down when the thrust load becomes excessive.

SUMMARY OF THE INVENTION

The present invention is directed to a bearing system for use in association with turbo machinery. The differential pressure across an associated compressor or expander or both is used to augment thrust bearing control in an active magnetic bearing system.

In a first and separate aspect of the present invention, active magnetic bearings provide rotational mounting for a rotor shaft. A compressor also associated with the shaft includes a controlled passage extending from the high-pressure back side of the rotor to controllably vent the pressure for axial thrust load adjustment.

In another and separate aspect of the present invention, active magnetic bearings provide rotational mounting for a rotor shaft. An expander also associated with the shaft includes a controlled passage extending from the back side of the rotor to the expander outlet to controllably balance the pressure across the expander-side rotor for axial thrust load adjustment.

Accordingly, it is an object of the present invention to provide an improved bearing system for improved axial control of a rotor shaft in turbomachinery using active magnetic bearings. Other objects and advantages will appear hereinafter.

DETAILED DESCRIPTION OF THE PREFERRED EMBODIMENTS

Figure 1:
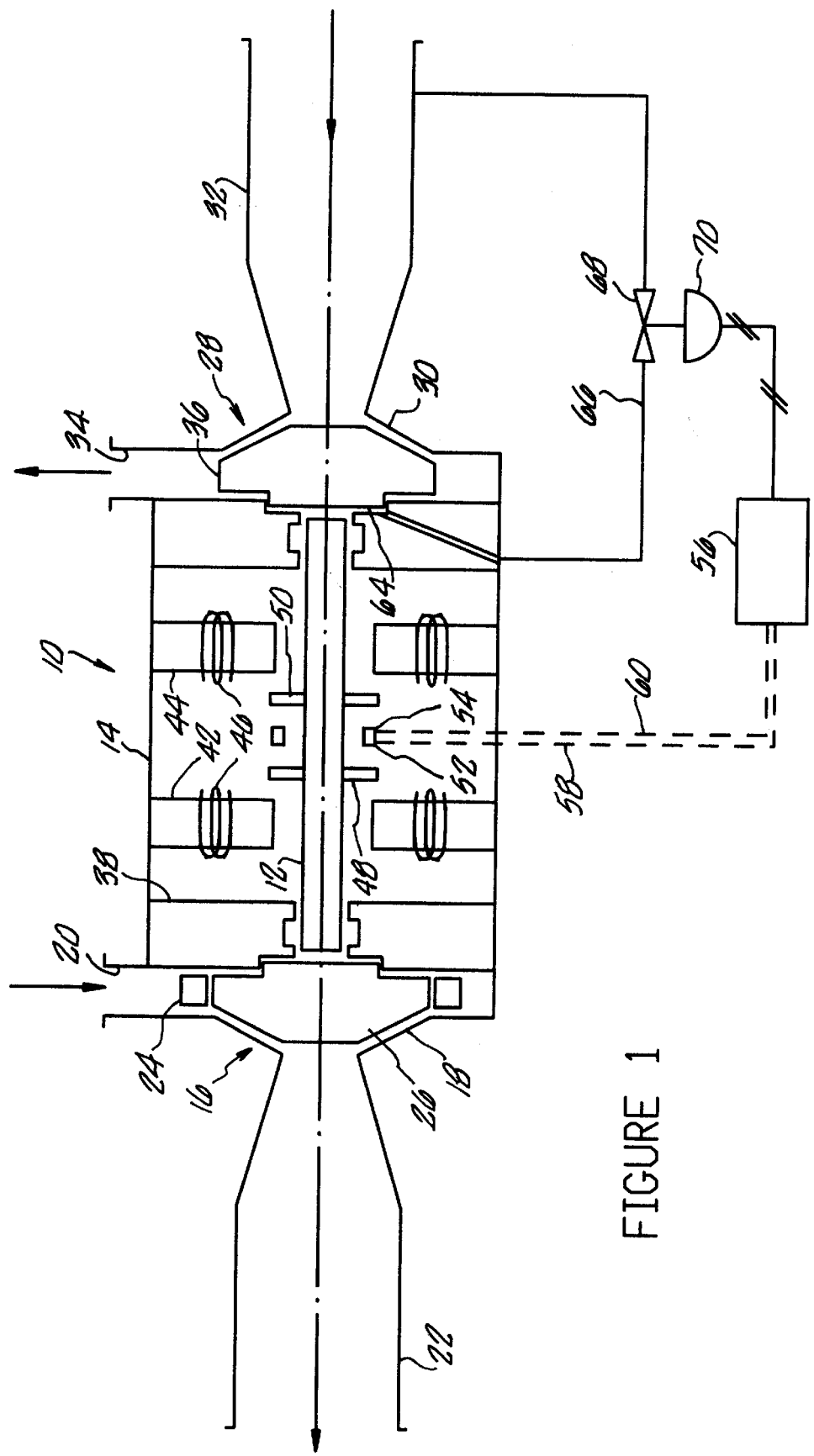
FIG. 1 is a schematic diagram of a turboexpander associated with a centrifugal compressor and an active magnetic bearing system with the compressor including a complementary thrust controlling system.
Figure 2:
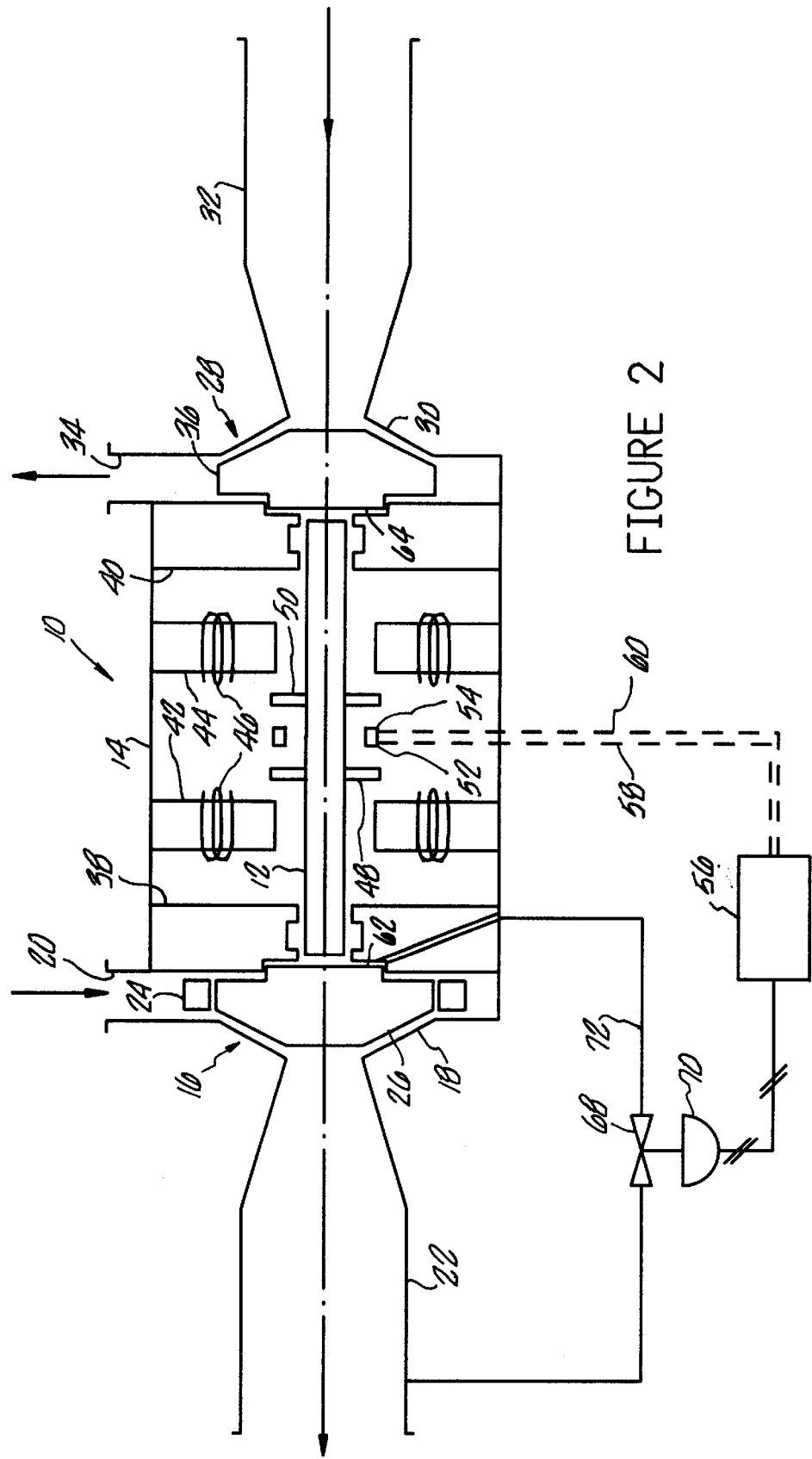
FIG. 2 is a schematic diagram of a turboexpander associated with a centrifugal compressor and an active magnetic bearing system with the expander including a complementary thrust controlling system.

In FIGS. 1 and 2, a centrifugal expander-compressor, generally designated 10, is illustrated as coupled together by a rotor shaft 12 extending through a bearing housing 14.

At one end of the device 10 is a turboexpander, generally designated 16. The turboexpander includes a turboexpander housing 18 having a radial inlet 20 and an axial outlet 22. In smaller units, both the inlet and outlet may be axial. Valve elements 24 condition the radial flow to the turbine. A rotor 26 is fixed to the rotor shaft 12 for rotatably mounting within the device.

At a second end of the device 10, a compressor, generally designated 28 is positioned with a housing 30, an axial inlet 32 and a radial outlet 34. A compressor rotor 36 is arranged within the housing 30 and is also fixed to the rotor shaft 12 for rotational mounting within the device.

The bearing housing 14 provides mounting for the rotor shaft 12. At each end are radial bearings 38 and 40 to mount the rotor shaft 12. These bearings may be of conventional active magnetic design. Conventional seals are also arranged at the radial bearings 38 and 40 so as to minimize flow into the bearing housing 14. Conventional active magnetic thrust bearings 42 and 44 are arranged in the bearing housing 14 about the rotor shaft 12. Each of the thrust bearings 42 and 44 includes an electromagnetic coil 46 arranged to activate the magnetic field of each thrust bearing 42 and 44. Fixed on the rotor shaft 12 are load thrust discs 48 and 50. When energized, each thrust bearing 42 and 44 is able to repulse the respective load thrust disc 48 and 50 so as to bring proper axial placement of the rotor shaft 12.

Associated with the load thrust discs 48 and 50 are probes 52 and 54. These probes 52 and 54 are mounted together to provide a drive sensor 52 and a load sensor 54. The probes 52 and 54 use the load thrust discs 48 and 50 as discontinuities on the rotor shaft 12 such that they can observe displacement axially along the shaft. The probes 52 and 54 are displaced from the discs 48 and 50 to provide proximity sensing rather than actual contact. This active magnetic thrust bearing arrangement, including the probes 52 and 54, is conventional. A controller 56 is also conventionally used with the probes 52 and 54 to determine axial displacement and respond by activating the coils 46 on one or the other of the conventional active magnetic trust bearings 42 and 44.

The probes 52 and 54 will present an equal signal through lines 58 and 60 to the controller 56 with the shaft 12 in appropriate axial position. As the shaft 12 moves axially, one probe presents a stronger signal than the other probe, initiating corrective energizing of one of the electromagnetic coils 46. Naturally, axial movement in an opposite direction would initiate the opposite response.

In operation, the device 10 is supplied with pressurized gas to the turboexpander inlet 20. This generates rotational power in the shaft 12 which is employed to drive the compressor rotor 36. The compressor rotor 36 in turn draws gas axially into the compressor, discharging it radially through the outlet 34. In both the turboexpander 16 and the compressor 28, high pressure associated with the radial port can be communicated to gas cavities 62 and 64 behind each rotor 26 and 36, respectively. The flow into the turboexpander 16 is typically variable and unpredictable as it is usually derived from other processing steps and systems. The compressor 28, on the other hand, is itself the source of pressure. Consequently, the pressure which can accumulate in the gas cavity 64 is typically more consistent in a given system with rotational speed.

In either cavity 62 and 64, an increase in pressure can generate an increased force load toward each rotor from its respective cavity. Naturally, this tends to axially displace the shaft 12. Under sufficiently adverse conditions, the conventional active magnetic thrust bearings 42 and 44 may not be able to handle the load. Under such circumstances, the customary response is to have the system shut down. This necessary action can be disruptive and detrimental to the overall operation. Conventional active magnetic thrust bearings 42 and 44 are unfortunately limited in their capacity due to geometry, available space and the like.

Referring specifically to FIG. 1, a first preferred embodiment will now be described. To augment the active magnetic thrust bearings 42 and 44, a control passage 66 may be employed that extends from a low-pressure zone in the compressor to a high-pressure zone. In the preferred embodiment of FIG. 1, the low-pressure zone is defined by the axial inlet 32 of the compressor 28. The high-pressure zone uses the gas cavity 64 between the compressor rotor 36 and the compressor housing 30. A control valve 68 is located in the control passage 66 and is coupled to a drive 70, which in turn is controlled by the controller 56. The controller 56 is used to vent gas to adjust the axial position of the shaft 12. As the shaft moves to the right as seen in FIG. 1, additional gas is vented. Less gas or no gas is vented as the shaft 12 moves beyond neutral and to the left. The controller 56 operates again on a greater than equal, less than equal arrangement between probe signals. This added control, simple and inexpensive, can complement the magnetic thrust bearing operation to avoid shutdowns and damaging conditions.

Referring specifically to FIG. 2, a second preferred embodiment will now be described. In FIG. 2, reference to elements and features also depicted in FIG. 1 is by like numerals. In the second preferred embodiment, to augment the active magnetic thrust bearings 42 and 44, a control passage 72 may be employed that extends from a low-pressure zone in the expander to a high-pressure zone. In the preferred embodiment of FIG. 2, the low-pressure zone is defined by the axial outlet 22 of the turboexpander 16. The high-pressure zone uses the gas cavity 62 between the turboexpander rotor 26 and the turboexpander housing 18. A control valve 68 is located in the control passage 72 and is coupled to a drive 70, which in turn is controlled by the controller 56. The controller 56 is used to vent gas to adjust the axial position of the shaft 12. As the shaft moves to the left as seen in FIG. 2, additional gas is vented. Less gas or no gas is vented as the shaft 12 moves beyond neutral and to the right. The controller 56 operates again on a greater than equal, less than equal arrangement between probe signals. This added control, simple and inexpensive, can complement the magnetic thrust bearing operation to avoid shutdowns and damaging conditions.

The complimentary thrust balancing system described in the preferred embodiments above is not employed for all thrust imbalances. In the active magnetic thrust bearings used in the preferred embodiments, there is a quasi-linear relationship between thrust load and magnetic bearing current. When the thrust bearing current is less than or equal to 20% of its maximum value, the complimentary thrust balancing system remains inactive, and the active magnetic bearings behave like conventional active magnetic bearings. When the thrust bearing current exceeds 20% of its maximum value, however, the instant complimentary thrust balancing system activates. This 20% bias helps to prevent hunting.

Accordingly, an improved bearing system for a turboexpander-compressor system is disclosed. While embodiments and applications of this invention have been shown and described, it would be apparent to those skilled in the art that many more modifications are possible without departing from the inventive concepts herein. For example, a complimentary thrust balancing system could simultaneously influence the flow at the compressor and the expander sides. The invention, therefore is not to be restricted except in the spirit of the appended claims.

What is claimed is:

1. A turboexpander comprising a turboexpander housing;

a radial inlet into said turboexpander housing;

an axial outlet from said turboexpander housing;

a turboexpander rotor in said turboexpander housing;

a compressor housing;

an axial inlet into said compressor housing;

a radial outlet from said compressor housing;

a compressor rotor in said compressor housing;

a shaft mounting said turboexpander rotor and said compressor rotor;

an active magnetic thrust bearing system positioned about said shaft between said turboexpander rotor and said compressor rotor said active magnetic thrust bearing system comprising first and second thrust discs mounted on the shaft, each thrust disc have an inner and an outer surface substantially perpendicular to the shaft, the inner surface of the first thrust disc facing the inner surface of the second thrust disc, and a first electromagnet positioned adjacent to the outer surface of the first thrust disc and a second electromagnet positioned adjacent to the outer surface of the second thrust disc, wherein:

the first electromagnet is arranged to act only on the first thrust disc;

the second electromagnet is arranged to act only on the second thrust disc;

the first thrust disc is spaced apart axially from the second thrust disc;

the first electromagnet is arranged to repulse the first thrust disc in only a first axial direction;

the second electromagnet is arranged to repulse the second thrust disc in only a second axial direction; and the first axial direction is opposite the second axial direction; a discontinuity on said shaft for measuring axial displacement of the shaft;

a proximity sensor adjacent said discontinuity to locate said discontinuity axially relative to said active magnetic thrust bearing system;

a control passage extending from a low-pressure zone in said axial inlet to a high-pressure zone between said compressor housing and the back of said compressor rotor;

a control valve in said control passage; and a controller coupled with said proximity sensor and said control valve and responsive to the axial position of the turboexpander shaft as detected by said proximity sensor to regulate said control valve.

2. A turboexpander according to claim 1, wherein a thrust bearing current controlling the thrust generated by the thrust bearing system has a maximum value and said controller only regulates said control valve when said thrust bearing current exceeds 20% of said maximum value.

3. A turboexpander according to claim 1, wherein said discontinuity is the first or second thrust disc.

* * * * *